INVENTOR
Max M. Adams

United States Patent Office 3,425,277
Patented Feb. 4, 1969

3,425,277
ELECTRICAL THERMAL FLOWMETER
Max M. Adams, Cincinnati, Ohio, assignor to General Electric Company, a corporation of New York
Filed Nov. 14, 1966, Ser. No. 593,999
U.S. Cl. 73—204          6 Claims
Int. Cl. G01f 1/00

ABSTRACT OF THE DISCLOSURE

A flow meter is shown comprising a pair of thermistors in opposite arms of a Wheatstone bridge which is energized by a constant power output source. One of the thermistors is isolated from a liquid flow path while the other thermistor is disposed in the flow path. A heating element is disposed upstream of the thermistor in the flow path. Unbalance in the Wheatstone bridge adjust flow of current to the heating coil to maintain equal resistances in the two thermistors. Current flow to the heating coil provides measurement of the flow rate. A second embodiment shows the same principle employed to measure fuel-to-air ratio.

---

Figure 1:
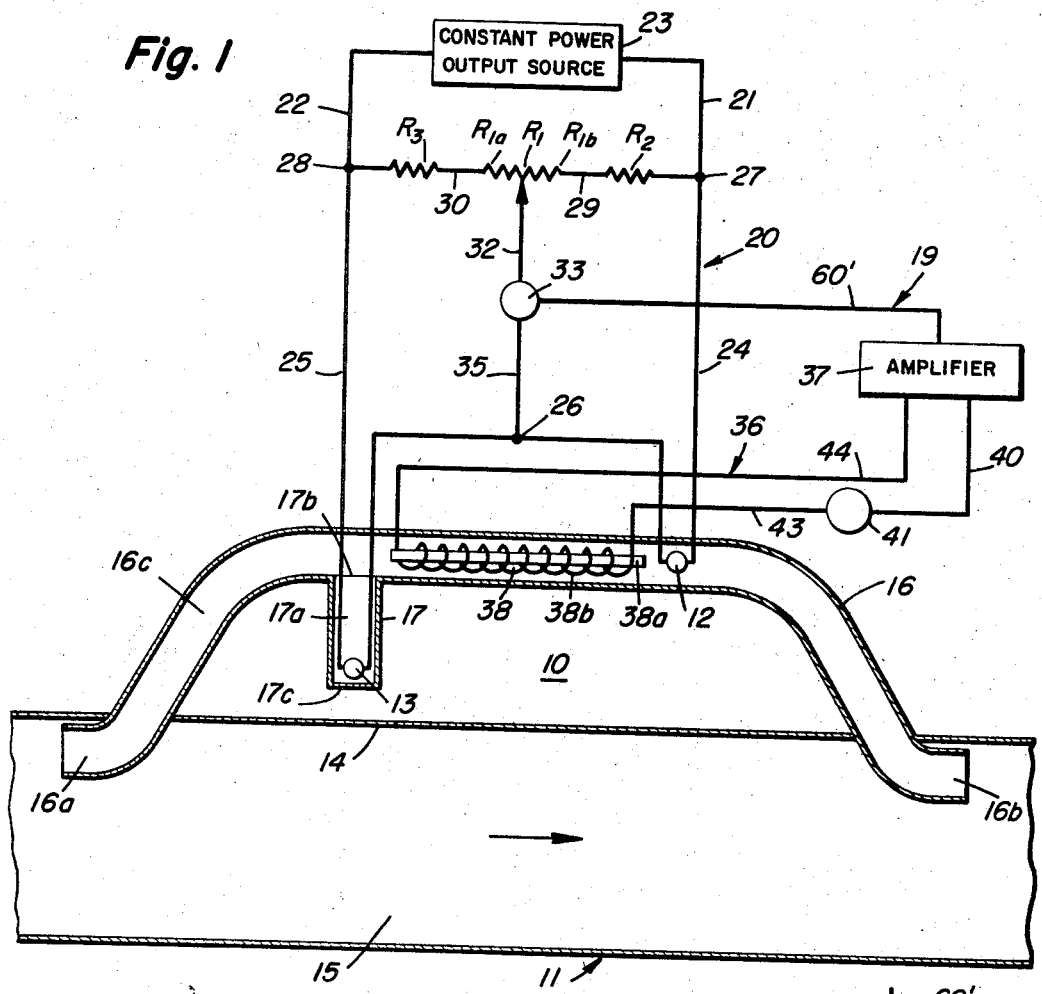

The present invention relates to electrical apparatus for sensing a condition of a fluid medium and is more particularly concerned with new and useful improvements in apparatus which depends upon exchanging heat with a fluid medium and defining through heat restoration a condition other than temperature.

Measurements which relate to flow of a fluid medium have been made in the prior art through using a pair of thermistors immersed in the fluid medium with the pair of thermistors forming components of a Wheatstone bridge wherein a first one of the thermistors is exposed to flow and is heated to above ambient temperature of the fluid medium and the second one of the thermistors, also exposed to flow, adopts ambient temperature of the fluid medium and therefore a relatively low temperature. The first one of the thermistors is variably cooled by the fluid medium as flow of the fluid medium varies and the Wheatstone bridge accordingly has an output signal. The signal controls a feed-back circuit in which a supplemental heater restores heat to the first one of the thermistors toward maintaining a constant differential in temperature between the pair of thermistors. Through including in the feed-back circuit a measuring device which is sensitive to the current being fed to the supplemental heater, a measure is had of a function of the supplemental heat which is being demanded to sustain the bridge in balance. Under certain circumstances this measure is satisfactorily representative of flow of the fluid medium. Where sequential quantities of the fluid medium at different temperatures adjust the temperatures of the first and second thermistors, though, it must be appreciated that with the Wheatstone bridge balanced with reference to having the thermistors exposed to an initial ambient temperature of the fluid medium, a variation from that ambient temperature affects the electrical resistivities of the thermistors by amounts which vary from the electrical resistivities which existed when the Wheatstone bridge was initially balanced with the first one of the thermistors heating at a temperature above ambient temperature of the fluid medium and with the second one of the thermistors at the ambient temperature of the fluid medium. With change in the ambient temperature of the fluid medium, therefore, substantially different temperature levels of the first and second thermistors vary to substantially different new levels and the first and second thermistors acquire a differential in electrical resistivity which is of a considerably different magnitude than the differential in electrical resistivity which existed between the thermistors when the Wheatstone bridge was initially balanced. Thus by having the first thermistor heated to above ambient temperature of the fluid medium and the second one of the thermistors at ambient temperature of the fluid medium, and in this manner accordingly seeking to restore heat to the first one of the thermistors as a function of cooling of the latter by flow of the fluid medium, errors arise from change in the ambient temperature of the fluid medium.

Among the objects of the present invention, therefore, is the provision of apparatus which can accurately sense a condition of a fluid medium other than temperature while erasing error which otherwise may be caused by variations in temperature of the fluid medium.

Other objects in part will be obvious and in part pointed out more fully hereinafter.

Briefly, the invention contemplates apparatus by which a condition of a fluid medium is measured using a network wherein bridge means has first and second arms respectively including first and second similar thermistor means each of which therefore varies similarly in electrical resistivity in accordance with temperature. Both of the first and second thermistor means are disposed in heat transfer relation to the fluid medium and are electrically energized from a constant power output source to operate at similar temperatures exceeding the ambient temperature of the fluid medium when the bridge is in balance in the absence of the condition which is to be measured. The bridge has balancing means connected with the first and second thermistor means for ohmic affects of the ambient temperature of the fluid medium upon each of the first and second thermistors to be balanced out in the bridge for the bridge to have the aforementioned balance in the absence of the condition which is to be measured. The second thermistor means is arranged to be isolated from a cooling effect due to a rise in the fluid medium in proportion to the condition which is to be measured, and the first thermistor means is arranged to be exposed to this cooling effect, for the resulting differential in cooling of the first and second thermistor means to promote output from the bridge which is proportional to the condition that is to be measured. An electrically energizable supplemental heater means is disposed in heat transfer relation to the first thermistor means and isolated from the second thermistor means for supplementally heating the first thermistor means to the substantial exclusion of the second thermistor means. An amplifier is connected with the bridge and with the supplemental heater means and is responsive to the bridge output to control supply of an electrical heating current to the supplemental heater means to restore the temperature of the first thermistor means. Also, an electrical current responsive signalling device has an electrical current relationship with the supplemental heater means to give a signal commensurate with the value of the heating current energizing the supplemental heater means and commensurate with the condition which is to be measured.

For sensing flow as a condition of a fluid medium, a flow sensitive instrument having the first and second thermistor means arranged to present these devices each heated in the aforementioned manner to transfer heat to the fluid medium and so that cooling of the first thermistor means will vary with rate of flow of the medium while the second thermistor means remains substantially isolated from flow rate of the medium.

Figure 2:
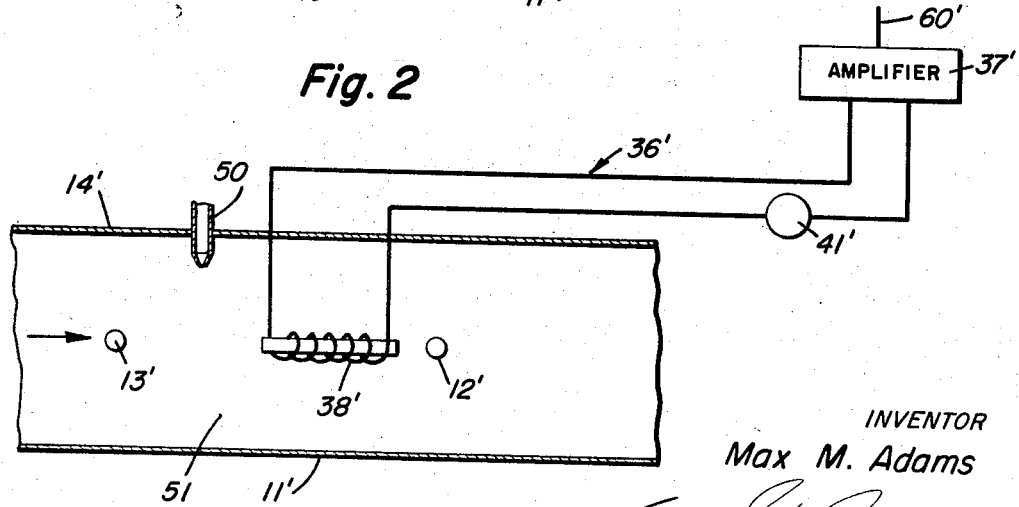

In the accompanying drawing representing several illustrative embodiments of the present invention:

FIGURE 1 is a diagrammatic showing of a flow-sensitive instrument in association with fluid duct-work; and FIGURE 2 schematically represents a modification as applied to fuel and air duct-work, having portions of the related instrument arranged for the instrument to sense fuel-to-air ratio.

Referring now more particularly to FIGURE 1 herein, a flow-sensitive instrument 10 is associated with duct-work wherein there is a main duct 11, the latter having a flow passage 15 for a fluid medium such as gas, liquid or vapor to be supplied through the duct and travel in the direction of the arrow. The flow-sensitive instrument 10 includes function sensing means wherein a first thermistor 12 and a second thermistor 13 are represented within casing members 16 and 17, which interiorly communicate with the flow passage 15 while extending outside wall 14 of the main duct. Each of the thermistors 12 and 13 has a negative temperature coefficient of resistance but may of course be replaced by thermistors in which the temperature coefficient of resistance is positive. Casing member 16 more particularly is a further component of the duct-work and is provided with opposite ends 16a and 16b which enter duct 10 through wall 14 so that ends 16a and 16b respectively occupy upstream and downstream positions in the flow passage 15 in the direction in which the fluid medium flows through passage 15. Furthermore, the casing member 16 is tubular forming a passageway 16c which has smaller dimensions in cross section than the main duct 11 and interconnects the open ends 16a and 16b for a fraction of the fluid medium in the flow passage 15 to flow from end 16a to end 16b through the passageway 16c. For the latter purpose, end 16a opens in an opposite direction with reference to flow in the passage 15 and end 16b opens in the same direction as that in which flow occurs through passage 15. Thermistor 12 is situated within the passageway 16c and is suitably secured to the casing member 16 so as to be in a heat transfer relation to the fluid medium which is flowing through the passageway 16c, so that the thermistor 12 is in a thermally conductive relation to the fluid medium in the passageway 16c and will be cooled by flow of the fluid medium. Further in accordance with the present embodiment, casing member 17 includes a hollow cupped member securely on the wall of casing member 16. An outer end 17c of the casing member 17 is closed and an opposite end 17b of this same member is open into the passageway 16c. The hollow cupped member as situated has an axis through opposite ends 17b and 17c which is transverse to the passageway 16c, for a portion of the medium to have deviated from the passageway 16c into the cavity 17a through open end 17b and remain there stagnated in the cavity against flow. Thermistor 13 is suitably mounted and is disposed within the cavity 17a of casing member 17 so as to be in a thermally conductive relation to the fluid medium in the cavity and yet be substantially isolated from flow of the fluid medium in the passageway 16c.

Thermistors 12 and 13 are components of a network 19 wherein there is a Wheatstone bridge arrangement 20 having power leads 21 and 22 electrically interconnecting junctions 27 and 28 with a constant power output source 23, which power source is adequate for heating each of the thermistors 12 and 13 to exceed in temperature any particular ambient temperatures which may be introduced from a range of ambient temperatures by the fluid medium. Arms 24 and 25 of the bridge respectively include the thermistors 12 and 13 which are interconnected electrically in series with each other at an intermediate junction 26 of the arms 24 and 25. The thermistors have similar electrical resistance characteristics and, as connected and energized from the contact power output source 23, are suited to heat to substantially equal temperatures exceeding the ambient temperature of the fluid medium under static conditions of the latter. Arms 29 and 30 of the bridge 20 include a linear fixed resistance $R_1$ which at opposite ends is connected electrically with fixed linear resistances $R_2$ and $R_3$ which in turn have junctions 27 and 28 with arms 24 and 25 of the bridge, placing the linear fixed resistances $R_1$, $R_2$ and $R_3$ and the thermally-sensitive electrical resistance devices 12 and 13 electrically in parallel with the constant power output source 23 from junctions 27 and 28 and across the power leads 21 and 22. The linear fixed resistance $R_1$ is a component of a potentiometer having a slider 32 electrically connected with a summing junction 33, the latter being in common to a lead 35 from the junction 26 which is intermediate the thermistors 12 and 13. Any given position of the slider 32 along the resistance $R_1$ defines substantially fixed linear resistance portions $R_1a$ and $R_1b$ which thus are allocated respectively to the bridge arms 29 and 30, with the resistances $R_2$ and $R_3$ also being in those arms.

A feed-back system 36, in the network 19 of the flow-sensitive instrument 10, is connected electrically with the summing junction 33 of the bridge 20. The feed-back system includes an amplifier 37 which is controlled by the bridge output from the summing junction 33, there being an input connection 60 from this junction to the amplifier control, and the amplifier being of an integrating type, although instead any high gain amplifier may be used. Integrating amplifiers such as the one illustrated schematically at 37 in FIGURE 1 of the drawing produce output currents which are proportional to the time integral of the amplifier control voltage. A further discussion of the construction and operation of such integrating amplifiers can be had by referring to pages 16 to 19 of Electronic Analog Computers, Korn and Korn, McGraw-Hill Book Comapny, Inc., New York (1952).

A supplemental heating device 38, energized on the output of the amplifier 37 is included in the feed-back system 36 for supplying an amount of heat to the fluid which compensates the thermistor 12 for the cooling effect of flow of the fluid medium in passageway 16c of the casing member 16. Device 38 is disposed upstream in the passageway 16c from the thermistor 12 and is downstream from the open end 17c of the casing member 17 and has a heat generating capacity for the amount of heat generated therein to restore the heat energy carried away from the thermistor 12 by flow of the fluid medium, accordingly for the electrical energy being supplied to the device 38 to represent flow of the fluid medium. While any of a variety of such devices 38 may be used for the purpose, the device in the embodiment shown is an electrical resistance heater having a mounting strip 38a on which the heater element 38b is wound from wire having a substantially constant resistivity throughout a desired temperature range of heating to restore heat to the thermistor 12. The heater element 38b of the resistance heater 38 may for example be of an alloy containing approximately 75% nickel, 20% chromium, 2.5% aluminum and 2.5% copper.

A circuit including the electrical resistance heater 38 may be traced from the output side of amplifier 37 over lead 40 to an electrical current measuring device 41 and thence over lead 43 to one end terminal of the electrical resistance heater 38, through the heater and from the opposite end terminal thereof back over lead 44 to the return side of the amplifier.

In further particular, illustrative type and rating of various components of the measuring instrument 10 are as follows:

Thermistors 12 and 13 each being a No. 44005 thermistor having a resistance of 3000 ohms at 25° C. and product of Y.S.I. Components Division of Yellow Springs Instruments, Yellow Springs, Ohio, Linear Resistance $R_1$ being 1000 ohms, Linear Resistances $R_2$ and $R_3$ each being 2000 ohms, and Linear Resistance 38 being 3000 ohms.

The electrical current measuring device 41 is constructed and arranged to represent flow of the fluid medium in duct 11 and for this purpose to sense a function of the electrical power being required by heater 38 to restore heat in the thermistor 38 for supplanting that being carried away from the latter by flow of the fluid medium. Measuring device 41 may for example be a thermocouple instrument of known type having an indicator to deflect relative to a scale for deflection of the indicator to be proportional to the time integral of the power demand of the heater 38 and accordingly to mass flow of the fluid medium in duct 10 with the scale being graduated to enable direct reading of the mass flow of the fluid medium.

In operation, bridge 20 of the instrument 10 is energized on electrical supply from the constant power output source 23 to bring the thermistors 12 and 13 to about the same temperature above the ambient temperature of the fluid medium. The temperature of each of the thermistors 12 and 13 may for example be about 1.5° F. above the ambient temperature of the fluid medium in the passageway 16c. With the thermistors 12 and 13 heated in the manner indicated, bridge 20 then is subjected to a balancing operation at zero flow of the fluid medium. The balancing operation is accomplished by setting the slider 32 appropriately to a position along the resistance $R_1$ which corresponds to zero signal output of the bridge 20, and the balanced bridge substantially erases the ohmic effect which the thermistors 12 and 13 develop from transferring heat to the ambient fluid medium. Although the ambient temperature of the fluid medium may vary, this variance will affect the temperatures of the thermistors 12 and 13 substantially equally and the bridge 20 as initially balanced still substantially erases the ohmic effect which the thermistors 12 and 13 develop from heat transfer to the static fluid medium. With each instant of flow of the fluid medium in the direction of the arrow in FIGURE 1 through passage 15 a portion of the medium deviates into the upstream end 16a of casing member 16 and flows through the passageway 16c and thence back into the duct 11 from the downstream end 16b of the housing member 16. Meanwhile quantities of the fluid medium stagnate against flow in the cavity 17a of the casing member 17. Thermistor 13 is substantially isolated from rate of flow of the fluid medium in the passageway 16c by being in cavity 17a and the fluid medium therein being stagnated against flow. The condition in casing member 17 prevails while the thermistor 12 in the flow passageway 16c of the casing member 16 is being cooled. As the result, heat is being transferred from the thermistor 12 more rapidly than from the thermistor 13 and the bridge 20 tends to become unbalanced. The amplifier 27 detects this tendency and puts sufficient energy into the thermistor 12, through the supplemental heating device 38 in favor of sustaining the bridge balanced. The electrical energy put into the supplemental heating device 38 to sustain the bridge 20 in balance for any of various rates of flow of the medium in the flow passageway 16c is continued until again a change in the rate of flow of the fluid medium is sensed through the bridge under the effect of a corresponding change in the rate of cooling of the device 12, requiring that the temperature of thermistor 12 be restored on the signal to the amplifier 27 and the energy which the amplifier commensurately supplies to the supplemental heating device 38 to compensate for the heat transfer from the device 12 which is represented by flow. Meanwhile, the energy supplied from the amplifier 27 is detected by the measuring device 41 as being a function of flow of the fluid medium. It will be appreciated that the flow sensitive instrument 10, being self-compensating for absolute temperature of a fluid medium, is also self-compensating for pressure where gaseous flow measurements are required.

In the embodiment represented in FIGURE 2, a fuel-to-air ratio measuring instrument having features akin to the instrument 10, except as follows, is associated with an air duct 11' through which air flows in the direction of the arrow from a suitable source of supply not shown. A first thermistor 12' and a second thermistor 13' are both suitably supported in the air duct 11' in heat transfer relation to the air in the duct, respectively at downstream and upstream locations, and furthermore are arranged exposed to be cooled by flow of the air in the duct. Thermistors 12' and 13' are similar and therefore vary similarly in electrical resistivity in accordance with ambient temperature of the duct air and in accordance with flow in the duct 11'. Both of the thermistors 12' and 13' are in arms of a Wheatstone bridge of the character hereinbefore described and are heated from a constant power output source to operate at similar temperature exceeding the ambient temperature of the air in the duct 11'. When the bridge is in balance both the effect of flow and the effect of thermal conduction of the fluid medium upon the thermistors 12' and 13' are canceled. A fuel input means having nozzle 50 emptying through wall 14' of the air duct into a fuel and air mixing region 51 between the thermistors 12' and 13' is suitably controlled as by means of a valve, not shown, for adding a volatile fuel in any of various quantities to the air flowing in the region 51. Vaporization of the fuel added in the latter region exercises a cooling effect upon the thermistor 12' and accordingly the Wheatstone bridge has electrically a function of the fuel-to-air ratio for output and has this output control, over lead 60', an amplifier 37' in a feed-back system 36', for the current flowing in the feed-back system and through the supplemental electrical heater 38' in that system to be a function of the fuel-to-air ratio while the heater 38' restores the temperature of thermistor 12'. Heater 38', as shown, is disposed downstream from the fuel and air mixing region 51 and upstream from the thermistor 12'. The fuel-to-air ratio is measured by a current sensing device 41' in the feed-back circuit.

As the present invention lends itself to many possible embodiments and as many possible change may be made in the embodiments hereinbefore set forth, it will be distinctly understood that all matter described herein is to be interpreted as illustrative and not at a limitation.

I claim:

1. In an apparatus for measuring a condition of a fluid medium, the combination which comprises, a Wheatstone bridge including first and second similar thermistor means both disposed in heat transfer relation to the fluid medium and electrically energized from a constant power output source to operate at similar temperatures exceeding the ambient temperature of the fluid medium when said bridge is in balance in the absence of said condition, said bridge having balancing means connected with said first and second thermistor means for ohmic effects of said ambient temperature of the fluid medium upon each of said first and second thermistor means to be balanced out in said bridge for said bridge to have said balance in the absence of said condition, and said second thermistor means being arranged to be isolated from a cooling effect due to a rise in the fluid medium in proportion to said condition and said first thermistor means being arranged to be exposed to said cooling effect, for the resulting differential in cooling of said first and second thermistor means to cause said bridge to have an output proportional to said condition, electrically energizable supplemental heater means disposed in heat transfer relation to said first thermistor means and isolated from said second thermistor means for supplementally heating said first thermistor means to the substantial exclusion of said second thermistor means, amplifier means connected with said bridge and with said supplemental heater means and responsive to said bridge output to control supply of an electrical heating current to said supplemental heater means to restore the temperature of first thermistor means, and an electrical current responsive signalling device having an electrical current relationship with said supplemental heater means to give a signal commensurate with the value of the heating current energizing said supplemental heater means and commensurate with said condition of the fluid medium.

2. In apparatus for measuring a condition of a fluid medium, the combination as set forth in claim 1, and said condition of said fluid medium being flow.

3. In apparatus for measuring a condition of a fluid medium, the combination as set forth in claim 2, wherein said first thermistor means is within a passageway for flow of said fluid medium in a direction through said passageway to cool said first thermistor means, and said second thermistor means is within a cavity entrant from said passageway laterally of said passageway, said cavity being to accommodate said second thermistor means and receive fluid medium from flow of said fluid medium in said passageway for the fluid medium received to stagnate against flow.

4. In apparatus for measuring a condition of a fluid medium, the combination as set forth in claim 3, wherein said supplemental heater means is located upstream in said passageway from said first thermistor means and downstream in said passageway from where said cavity is entrant from said flow path.

5. In apparatus for measuring a condition of a fluid medium, the combination as set forth in claim 4, wherein opposite ends of said passageway communicate with a main duct respectively at upstream and downstream locations with reference to flow of a fluid medium in a direction through said main duct, said passageway having smaller dimensions in cross section than said main duct, for a fraction of the fluid medium flowing in the flow direction in said main duct to enter the upstream end of said passageway and thence pass through said passageway back to said main duct at the downstream end of said passageway.

6. In apparatus for measuring a condition of a fluid medium, the combination as set forth in claim 1, wherein both of said first and second thermistor means have a heat transfer relation to air flowing through an air duct for said first and second thermistors to be respectively in downstream and upstream location in said duct and said bridge is balanced to cancel the effects of ambient temperature and flow of the air in said duct, there being fuel input means including a nozzle communicating with said duct for supplying a volatile fuel into an air mixing region in said duct to mix with air flowing in said region and exercise a cooling effect of vaporization upon said first thermistor means, and said electrical current responsive signalling device is arranged for giving a signal commensurate with the fuel to air ratio of the fuel and air mixture.

References Cited

UNITED STATES PATENTS

| 2,726,546 | 12/1955 | King | 73—204 |
| 2,813,237 | 11/1957 | Fluegel et al. | 73—204 X |
| 2,859,617 | 11/1958 | Adams | 73—204 |
| 2,994,222 | 8/1961 | Laub | 73—204 |
| 3,085,431 | 4/1963 | Yerman et al. | 73—204 |

FOREIGN PATENTS

| 278,201 | 1/1913 | Germany. |
| 357,100 | 8/1922 | Germany. |
| 1,035,324 | 7/1966 | Great Britain. |

RICHARD C. QUEISSER, *Primary Examiner.*

E. D. GILHOOLY, *Assistant Examiner.*

U.S. Cl. X.R.

73—202